United States Patent
Chanez et al.

(10) Patent No.: US 10,984,370 B2
(45) Date of Patent: Apr. 20, 2021

(54) METHOD AND APPARATUS FOR UNIT AND CONTAINER IDENTIFICATION AND TRACKING

(71) Applicant: INEXTO SA, Lausanne (CH)

(72) Inventors: Patrick Chanez, Cheyres (CH); Nicolas Schaefer, Orbe (CH); Roger Barata, Sainte-Croix (CH)

(73) Assignee: INEXTO SA, Lausanne (CH)

( * ) Notice: Subject to any disclaimer, the term of this patent is extended or adjusted under 35 U.S.C. 154(b) by 889 days.

(21) Appl. No.: 15/547,449

(22) PCT Filed: Jan. 28, 2016

(86) PCT No.: PCT/EP2016/051853
§ 371 (c)(1),
(2) Date: Jul. 28, 2017

(87) PCT Pub. No.: WO2016/120414
PCT Pub. Date: Aug. 4, 2016

(65) Prior Publication Data
US 2018/0032951 A1    Feb. 1, 2018

(30) Foreign Application Priority Data
Jan. 28, 2015    (EP) .................................... 15152959

(51) Int. Cl.
*G06Q 10/08*    (2012.01)
*G06K 7/14*    (2006.01)

(52) U.S. Cl.
CPC ......... *G06Q 10/0832* (2013.01); *G06K 7/146* (2013.01); *G06K 7/1439* (2013.01); *G06Q 10/0833* (2013.01)

(58) Field of Classification Search
CPC ........... G06Q 10/0832; G06Q 10/0833; G06K 7/1439; G06K 7/146
See application file for complete search history.

(56) References Cited

U.S. PATENT DOCUMENTS 4,035,615 A     7/1977 Best et al.
4,058,954 A  *  11/1977 Asami .................... G07D 9/065
                                                53/54

(Continued)

FOREIGN PATENT DOCUMENTS

CN        101354753        1/2009
CN        101609626        12/2009

(Continued)

OTHER PUBLICATIONS

Hartman, Lauren R., "Marking/coding versatility mets food labeling needs," Packaging Digest, 35.n4, p. 36(4), UBM Canon LLC, Apr. 1998.*

(Continued)

*Primary Examiner* — Nathan Erb

(57) ABSTRACT

There is provided a method and apparatus for tracking of items and containers of items. The method comprises generating a set of unique item identifier codes, each identifier code corresponding to a specific item in a set of items. Then, at a production line, uniquely identifying multiple items by marking the multiple items with the corresponding unique item identifiers. The method further includes detecting the unique item identifiers on the set of items and transmitting the detected unique item identifiers to a processor. After aggregating items into containers, containers are marked with container identifiers. The method then associates the detected container identifier in the database with detected item identifiers.

19 Claims, 14 Drawing Sheets

(56) References Cited

U.S. PATENT DOCUMENTS

| | | |
|---|---|---|
| 4,094,244 A | 6/1978 | Edwards et al. |
| 4,354,101 A | 10/1982 | Hester et al. |
| 4,463,250 A | 7/1984 | McNeight et al. |
| 4,529,871 A | 7/1985 | Davidson |
| 4,860,226 A | 8/1989 | Martin et al. |
| 4,963,719 A | 10/1990 | Brooks et al. |
| 5,382,779 A | 1/1995 | Gupta |
| 5,467,433 A | 11/1995 | Lamprecht, Jr. et al. |
| 5,621,864 A | 4/1997 | Benade et al. |
| 5,646,389 A | 7/1997 | Bravman et al. |
| 5,767,498 A | 6/1998 | Heske, III et al. |
| 5,805,779 A | 9/1998 | Christopher et al. |
| 5,837,983 A | 11/1998 | Actis et al. |
| 5,850,080 A | 12/1998 | Herzig |
| 5,892,900 A | 4/1999 | Ginter et al. |
| 5,930,215 A | 7/1999 | Fite et al. |
| 5,974,150 A | 10/1999 | Kaish et al. |
| 6,069,955 A | 5/2000 | Coppersmith et al. |
| 6,122,403 A | 9/2000 | Rhoads |
| 6,134,561 A | 10/2000 | Brandien et al. |
| 6,212,638 B1 | 4/2001 | Lee et al. |
| 6,217,966 B1 | 4/2001 | Finster et al. |
| 6,226,619 B1 | 5/2001 | Halperin et al. |
| 6,260,029 B1 | 7/2001 | Critelli |
| 6,272,634 B1 | 8/2001 | Tewfik et al. |
| 6,371,375 B1 | 4/2002 | Ackley et al. |
| 6,442,276 B1 | 8/2002 | Doljack |
| 6,456,729 B1 | 9/2002 | Moore |
| 6,546,729 B2 | 4/2003 | Hellat et al. |
| 6,547,137 B1 | 4/2003 | Begelfer et al. |
| 6,712,275 B1 | 3/2004 | Borg |
| 6,725,366 B1 | 4/2004 | Swanberg |
| 6,832,202 B1 | 12/2004 | Schuyler et al. |
| 6,892,947 B1 | 5/2005 | Jam et al. |
| 6,963,846 B1 | 11/2005 | Kelly et al. |
| 6,996,543 B1 | 2/2006 | Coppersmith et al. |
| 7,028,901 B2 | 4/2006 | Carlson |
| 7,188,258 B1 | 3/2007 | Aggarwal et al. |
| 7,246,748 B1 | 7/2007 | Feuerman et al. |
| 7,267,271 B2 | 9/2007 | Rhea |
| 7,283,630 B1 | 10/2007 | Doljack |
| 7,497,379 B2 | 3/2009 | Chen et al. |
| 7,539,868 B2 | 5/2009 | Balard et al. |
| 8,037,294 B2 | 10/2011 | Nochta |
| 8,175,578 B2 | 5/2012 | McCown et al. |
| 2001/0047340 A1 | 11/2001 | Snow et al. |
| 2002/0053796 A1 | 5/2002 | McCann et al. |
| 2002/0091593 A1 | 7/2002 | Fowler |
| 2002/0158133 A1 | 10/2002 | Conzola et al. |
| 2002/0158137 A1 | 10/2002 | Grey et al. |
| 2003/0042312 A1 | 3/2003 | Cato |
| 2003/0051767 A1 | 3/2003 | Coccaro et al. |
| 2003/0074223 A1 | 4/2003 | Hickle et al. |
| 2003/0126034 A1 | 7/2003 | Cheney et al. |
| 2004/0024790 A1 | 2/2004 | Everett |
| 2004/0084530 A1 | 5/2004 | McQueen et al. |
| 2004/0117265 A1 | 6/2004 | Hoffman |
| 2004/0140362 A1 | 7/2004 | Allen |
| 2004/0172260 A1 | 9/2004 | Junger et al. |
| 2004/0212480 A1 | 10/2004 | Carrender et al. |
| 2005/0006469 A1 | 1/2005 | Nonneman et al. |
| 2005/0019072 A1 | 1/2005 | Lin |
| 2005/0061878 A1* | 3/2005 | Barenburg ........... G07G 1/0045 |
| | | 235/385 |
| 2005/0097054 A1 | 5/2005 | Dillon |
| 2005/0108044 A1 | 5/2005 | Koster |
| 2005/0127176 A1 | 6/2005 | Dickinson et al. |
| 2005/0189255 A1 | 9/2005 | Safian |
| 2005/0234823 A1 | 10/2005 | Schimpf |
| 2005/0246237 A1 | 11/2005 | Hudetz et al. |
| 2005/0273369 A1 | 12/2005 | Ota et al. |
| 2005/0273434 A1 | 12/2005 | Lubow |
| 2005/0288938 A1 | 12/2005 | Date et al. |
| 2006/0011726 A1 | 1/2006 | Chen et al. |
| 2006/0080190 A1 | 4/2006 | Furukawa et al. |
| 2006/0091209 A1 | 5/2006 | He |
| 2006/0143180 A1 | 6/2006 | Peterson et al. |
| 2006/0144940 A1 | 7/2006 | Shannon et al. |
| 2007/0001006 A1 | 1/2007 | Schuessler et al. |
| 2007/0024449 A1 | 2/2007 | Bilyeu et al. |
| 2007/0051816 A1 | 3/2007 | Chu |
| 2007/0170241 A1 | 7/2007 | Grant |
| 2007/0203808 A1 | 8/2007 | Sekimoto et al. |
| 2008/0046263 A1 | 2/2008 | Sager et al. |
| 2008/0066167 A1 | 3/2008 | Andri |
| 2009/0014537 A1 | 1/2009 | Gelbman |
| 2009/0105866 A1 | 4/2009 | Fontanot |
| 2009/0159666 A1 | 6/2009 | O'Brien et al. |
| 2009/0230190 A1 | 9/2009 | Chanez et al. |
| 2009/0237253 A1 | 9/2009 | Neuwirth |
| 2009/0323967 A1 | 12/2009 | Peirce et al. |
| 2010/0258641 A1 | 10/2010 | Yu |
| 2011/0154046 A1 | 6/2011 | Fradet et al. |
| 2011/0265428 A1 | 11/2011 | Schmitz |
| 2012/0102334 A1 | 4/2012 | O'Loughlin et al. |
| 2012/0130868 A1 | 5/2012 | Loken |
| 2012/0215918 A1 | 8/2012 | Vasters et al. |
| 2012/0228388 A1 | 9/2012 | Kuo et al. |
| 2012/0254052 A1 | 10/2012 | Gao et al. |
| 2012/0280046 A1 | 11/2012 | Muirhead |
| 2012/0284505 A1 | 11/2012 | Smith et al. |
| 2012/0310848 A1 | 12/2012 | Gao et al. |
| 2012/0328180 A1* | 12/2012 | Dahari ................ G06T 7/0008 |
| | | 382/143 |
| 2012/0330913 A1* | 12/2012 | Devadhar ............ G06F 9/466 |
| | | 707/703 |
| 2013/0004946 A1 | 1/2013 | Chesnut et al. |
| 2013/0099901 A1 | 4/2013 | Jones et al. |
| 2013/0166062 A1 | 6/2013 | Casey |
| 2013/0169409 A1 | 7/2013 | Chang et al. |
| 2013/0226326 A1 | 8/2013 | Yoshida et al. |
| 2013/0283156 A1 | 10/2013 | Al Badrashiny et al. |
| 2013/0297929 A1 | 11/2013 | Chaves et al. |
| 2014/0025594 A1 | 1/2014 | Schmitz |
| 2014/0046852 A1 | 2/2014 | Chatelain et al. |
| 2014/0122479 A1 | 5/2014 | Panferov et al. |
| 2014/0173685 A1 | 6/2014 | Bittles et al. |
| 2014/0173688 A1 | 6/2014 | Fischer et al. |
| 2014/0189362 A1 | 7/2014 | Van Den Broeck et al. |
| 2014/0343719 A1* | 11/2014 | Collombet ............ G06Q 10/08 |
| | | 700/225 |
| 2014/0351601 A1 | 11/2014 | Jozwiak |
| 2014/0358993 A1* | 12/2014 | Sugiyama ............ H04L 69/40 |
| | | 709/203 |
| 2014/0367464 A1 | 12/2014 | Herzig |
| 2015/0242435 A1* | 8/2015 | He ....................... G06F 16/273 |
| | | 707/610 |
| 2015/0269559 A1 | 9/2015 | Inotay et al. |
| 2015/0310386 A1 | 10/2015 | Fradet et al. |
| 2015/0317644 A1 | 11/2015 | Chanez et al. |
| 2015/0332210 A1 | 11/2015 | Niquille et al. |
| 2016/0027021 A1 | 1/2016 | Kerdemelidis |
| 2016/0072626 A1 | 3/2016 | Kouladjie |
| 2016/0299685 A1 | 10/2016 | Zhai et al. |
| 2016/0307153 A1 | 10/2016 | Loken et al. |
| 2017/0109549 A1 | 4/2017 | Fradet et al. |
| 2018/0131520 A1 | 5/2018 | Brockhaus et al. |

FOREIGN PATENT DOCUMENTS

| | | |
|---|---|---|
| CN | 102054393 A | 5/2011 |
| CN | 102542215 | 7/2012 |
| CN | 103530752 A | 4/2014 |
| CN | 103935568 A | 7/2014 |
| CN | 103943523 A | 7/2014 |
| CN | 104252670 A | 12/2014 |
| EP | 1 645 992 A | 4/2006 |
| EP | 2104067 | 9/2009 |
| EP | 2172882 | 4/2010 |
| FR | 2 900 486 A | 11/2007 |
| GB | 2342743 | 4/2000 |
| JP | H-05151381 A | 6/1993 |
| JP | H07-156459 A | 6/1995 |

(56) References Cited

FOREIGN PATENT DOCUMENTS

| | | |
|---|---|---|
| JP | H08-69247 A | 3/1996 |
| JP | A-2001-328711 | 11/2001 |
| JP | A-2002-7970 | 1/2002 |
| JP | 2003-104562 A | 4/2003 |
| JP | 2003208234 | 7/2003 |
| JP | 2003233794 | 8/2003 |
| JP | 2004320715 A | 11/2004 |
| JP | 2005-060080 A | 3/2005 |
| JP | 2005/115890 | 4/2005 |
| JP | A-2005-200187 | 7/2005 |
| JP | A-2005-263472 | 9/2005 |
| JP | 2005-316940 A | 11/2005 |
| JP | 2006229582 | 8/2006 |
| JP | 2007-018355 A | 1/2007 |
| JP | 2007-528830 A | 10/2007 |
| JP | 2008-515741 A | 5/2008 |
| JP | 2009-151668 | 7/2009 |
| KR | 100911762 B1 | 8/2009 |
| RU | 2199781 C1 | 2/2003 |
| RU | 2216776 C2 | 11/2003 |
| RU | 2225641 C2 | 3/2004 |
| WO | WO-02/073551 A1 | 9/2002 |
| WO | WO-2005/083644 A | 9/2005 |
| WO | WO-2006/038114 A1 | 4/2006 |
| WO | WO-2010/063909 | 6/2010 |
| WO | WO-2014/122479 | 8/2014 |

OTHER PUBLICATIONS

"Best Compression algorithm for a sequence of integers", Nov. 12, 2008, Stack Overflow. (XP-002697996).

"Databases—No longer fit for purpose for Serialisation and Track & Trace", 2012.

Extended European Search Report in 15152959.1, dated Oct. 7, 2015, 4 pages.

PCT Written Opinion of the International Searching Authority in PCT/EP2016/051853, dated Nov. 4, 2016, 11 pages.

Extended European Search Report in 15153386.6, dated Oct. 16, 2015, 7 pages.

PCT Written Opinion of the International Searching Authority in PCT/EP2016/052008, dated Jan. 30, 2015, 10 pages.

PCT International Search Report in PCT/EP2016/072453, dated Dec. 5, 2016.

PCT International Search Report in PCT/EP2016/069316, dated Oct. 26, 2016.

PCT International Search Report in PCT/EP2016/070138, dated Dec. 7, 2016.

PCT International Search Report in PCT/EP2016/070137, dated Nov. 14, 2016.

Dodge et al., Codes of Life: Identification Codes and the Machine-Readable World, Dec. 2005, Environment and Planning D: Society and Space, vol. 23, pp. 851-881 (Year: 2005).

China National Intellectual Property Administration Search Report for Application No. 201580033643.9, 2 pages, dated Jul. 25, 2019.

Modi et al., "Securing the Manufacturing Environment using Biometrics", Oct. 2005, Proceedings 39th Annual 2005 International Carnahan Conference on Security Technology, pp. 275-278 (Year 2005).

In Japanese Patent Application No. 2017-540271, Notice of Reasons for Refusal, dated Nov. 28, 2019, 4pgs.

Communication issued by the Chinese patent office dated Jan. 15, 2021 for the related application N° ZL201680007632.8.

* cited by examiner

METHOD AND APPARATUS FOR UNIT AND CONTAINER IDENTIFICATION AND TRACKING

CROSS-REFERENCE TO RELATED APPLICATIONS

This application is a U.S. National Stage Application under 35 U.S.C. 371 of International Application No. PCT/EP2016/051853, filed Jan. 28, 2016, which claims the benefit of and priority to European Patent Application No. 15152959.1, filed Jan. 28, 2015, the contents of all of which are herein incorporated by reference in their entireties.

FIELD OF THE INVENTION

The present invention relates generally to techniques for labeling items of commerce to improve the traceability and the tracking of an item of commerce to the first and subsequent customers. The invention can be used to establish a link between a unique item identifier and outer packaging materials, also uniquely identified by a code.

BACKGROUND OF THE INVENTION

Counterfeiting and contraband is a major problem in many industries, and in particular the tobacco industry. To detect counterfeit products, there is a need to be able to authenticate genuine products throughout the supply chain. In order to authenticate a product as genuine, a manufacturer may uniquely mark each product during manufacture and then use that mark or marks to determine whether the product is genuine at a later time.

One way to authenticate a product that is shipped in a container holding a plurality of products is to mark the container with an identifier and to mark each individual product within the container with an identifier. The container identifiers and product identifiers are stored in a database together. A check can be made later in the supply chain to determine whether the product identifiers for products in a particular container correspond to the container identifier for the container. This check consists of comparing a read container and product identifier pair with pairs of identifiers stored in the database. If a matching container identifier and product identifier is in the database, then the product is determined to be genuine.

However, these existing systems are not practically possible to implement for very high volume products, and in particular for cartons of cigarettes in a case. The difficulty with the authentication method is often the volume of data that needs to be stored and sent in order to implement it.

The limitations of the existing systems are further highlighted when secure identifiers are used. For example, the product identifiers placed on certain products (such as easily counterfeited, expensive, or otherwise controlled products) may be complex in order that each identifier is unique and in order that the marking protocol cannot easily be discovered by potential counterfeiters. For this reason, product identifiers can be also encrypted. Secure tracking systems require additional data storage and time for authentication.

In distribution and logistics of many types of products, track and trace, or tracking and tracing, concerns a process of determining the current and past locations (and other information) of a specific product. In this context, the inventive item tracking system allows track and trace of products at individual unit level, as well as at the container level. As used herein, a "unit" of a product is considered to be a single item that is tracked through the system. A unit may eventually be sold in commerce as an individual item, or product. A "container" is an aggregation of two or more units of the product, and the container may also be sold as a single product in commerce. Multiple containers, each comprising multiple units, can be further aggregated into containers of containers. The systems described herein are applicable to various industries, such as the cigarette, food, and pharmaceutical industries, as well as any other industry that produces significant quantities of products that are aggregated into collective packaging. The systems are applicable to all types of goods, including as non-limiting examples, pharmaceuticals and other consumer goods, without regard to the speed at which the goods are produced.

BRIEF SUMMARY OF THE INVENTION

One embodiment of the invention includes a computer-implemented method for identifying manufactured products in containers, each container suitable for containing two or more items, the method comprising the steps of:

generating a set of unique item identifier codes, each item identifier code corresponding to a specific item in a set of items;

at a production line, uniquely identifying multiple items by marking the multiple items with the corresponding unique item identifier code;

at the production line, mechanically allocating two or more items to be aggregated in a container;

detecting the unique item identifier codes on the set of items having been aggregated in the container and transmitting the detected unique item identifier codes to a processor;

storing, in a database, the item identifier codes for each item detected;

at the production line, uniquely identifying the container by marking the container with a unique container identifier;

detecting the unique container identifier on the container and transmitting the detected unique container identifier to the processor;

storing, in a database, a container identifier for each detected container; and associating the detected container identifier in the database with the detected item identifiers.

According to one embodiment, ranges of identifiers, such as for units of a product, can be determined and the end points of those ranges stored together with the corresponding container identifier, rather than storing each individual unit identifier together with a container identifier. No information is lost with this scheme, but the data storage and data bandwidth requirements are dramatically reduced. According to another embodiment, the product identifiers can include production details. The production details can include a date and time of production, specified to the level of minutes, and an incremental counter value. The product identifiers of products allocated to a particular container can then be placed in a sequential order based on the production time and incremental counter value. Those products in the container having the same production time are placed in a single range, which is stored in the database by recording the lowest incremental counter value in the range and the highest incremental counter value in the range. If a container includes products produced in different minutes, then a plurality of ranges are required for that container. Given that, typically, many items can be produced per minute by a single production line, this method dramatically reduces data storage requirements.

BRIEF DESCRIPTION OF THE DRAWINGS

Embodiments of the invention will now be described, by way of example only, with reference to the accompanying drawings, in which.

DETAILED DESCRIPTION OF THE INVENTION

Types of Identifiers

Figure 1:
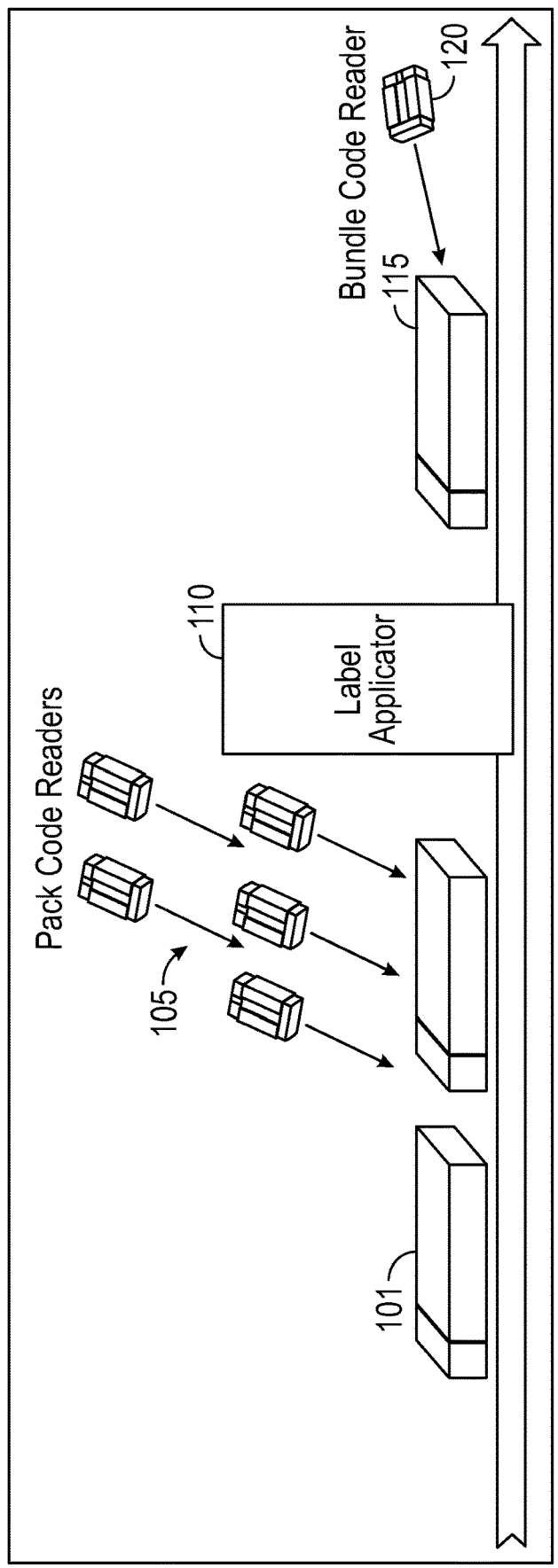
FIG. 1 illustrates an example architecture for a first embodiment.

Each item or container can be uniquely identified by a code. As used herein, the terms "code" and "identifier" are used interchangeably to refer to an identifier that is associated with a unit or a container and the terms "bundle" and "container" are used interchangeably. The code can be printed on the bottom part of the item or container in human readable format and encoded using a specific format. Example methods of printing include Dotcode or Datamatrix. Other techniques of suitable print speed and physical size may be used.

In some preferred embodiments, Dotcode can be used as standard machine readable code for individual items, such as cigarette packs. The code can be optimized for inkjet printers or laser printers. In a preferred embodiment, for standard cigarette packs (box or soft) using a 12 digits code, the encoding may be performed with a Dotcode of 7 dots height per 58 dots width. Other configurations may be used for printing and decoding efficiency. The code can be printed in black on white or grey background or printed in white on a black background. A quiet zone of at least one dot size can be used to secure sides of the Dotcode to improve reading efficiency. A larger quiet zone can also facilitate the overall decoding process.

Applying and Associating Codes

Multiple embodiments for applying codes to individual items and associating those codes with other items and containers are described in more detail below. Some or all of the various embodiments described below may be made available in a production facility and an operator panel may be provided so that user selection may be made between them.

The embodiments described herein may read codes having been placed on items and containers. The reading of the codes may be accomplished by one or more optical imaging devices, such as a laser scanner or other similar device necessary to read codes and that would be known to someone skilled in the art. In some cases, one optical imager or "reader" may be configured to read one code at a time. In other cases, one optical imager may be configured to read several codes at one time, such that fewer readers are required to read the same number of codes, whether on items or containers. Single code or multi-code readers can be substituted and used interchangeably in the embodiments described herein. While specific reference is made to optical mechanisms for reading codes or identifiers, non-optical methods could also be used interchangeably to read codes. For example, the optical readers and codes described herein could be substituted with RFID readers and RFID tags without departing from the scope of the invention.

Container Snapshot Embodiment

According to a first embodiment, in the container snapshot embodiment, a device is able to capture all item codes for a container at once and then aggregate the items with their parent container at that time. This embodiment is preferred when clear-wrap is used in the container-making process so that individual items can be scanned after aggregation into a container. The method can include detecting the unique item identifier codes on the set of items by imaging the identifiers through a clear-wrap binding the set of items into the container.

For this approach, each item may have a unique code bottom printed on it; each container may have a unique code printed on it; and a container ejection station may be located after the container snapshot device. As a non-limiting example, the container code may be printed using Datamatrix technique. The container snapshot embodiment is appropriate at least in situations where the container has already been formed and the remaining tasks include reading the item codes before the container label applicator, applying a label to the container, and then reading the container identifier.

Reading Process for Items

With reference to FIG. 1, the reading process can be performed with one or more readers (105), located just before or proximate to the container label applicator (110). In the container snapshot method, the individual items in the container (101) are read only once, shortly before the label is applied to the container. The container identifier having been applied to the container (115) is then imaged by a reader (120) after its application to the container. The association between the container identifier and those items comprising the container can be made on the basis of the proximity in time and space between reading the item identifiers and the container identifier after applying the container label.

FIG. 1 illustrates an example topology of the item tracking system. An objective of this topology is to reduce the delay between the capture of the item codes and the container code. This reduction in time improves the level of valid association between the items and their container. A reduced delay between the item reading process and the container reading process reduces the risks of invalid associations, due to human or mechanical events occurring during this delay. The method can include detecting the unique item identifier codes on the set of items at a location proximate in space to the step of mechanically allocating two or more items to be aggregated in a container or detecting the unique item identifier codes on the set of items at a location proximate in time to the step of mechanically allocating two or more items to be aggregated in a container.

Figure 2:
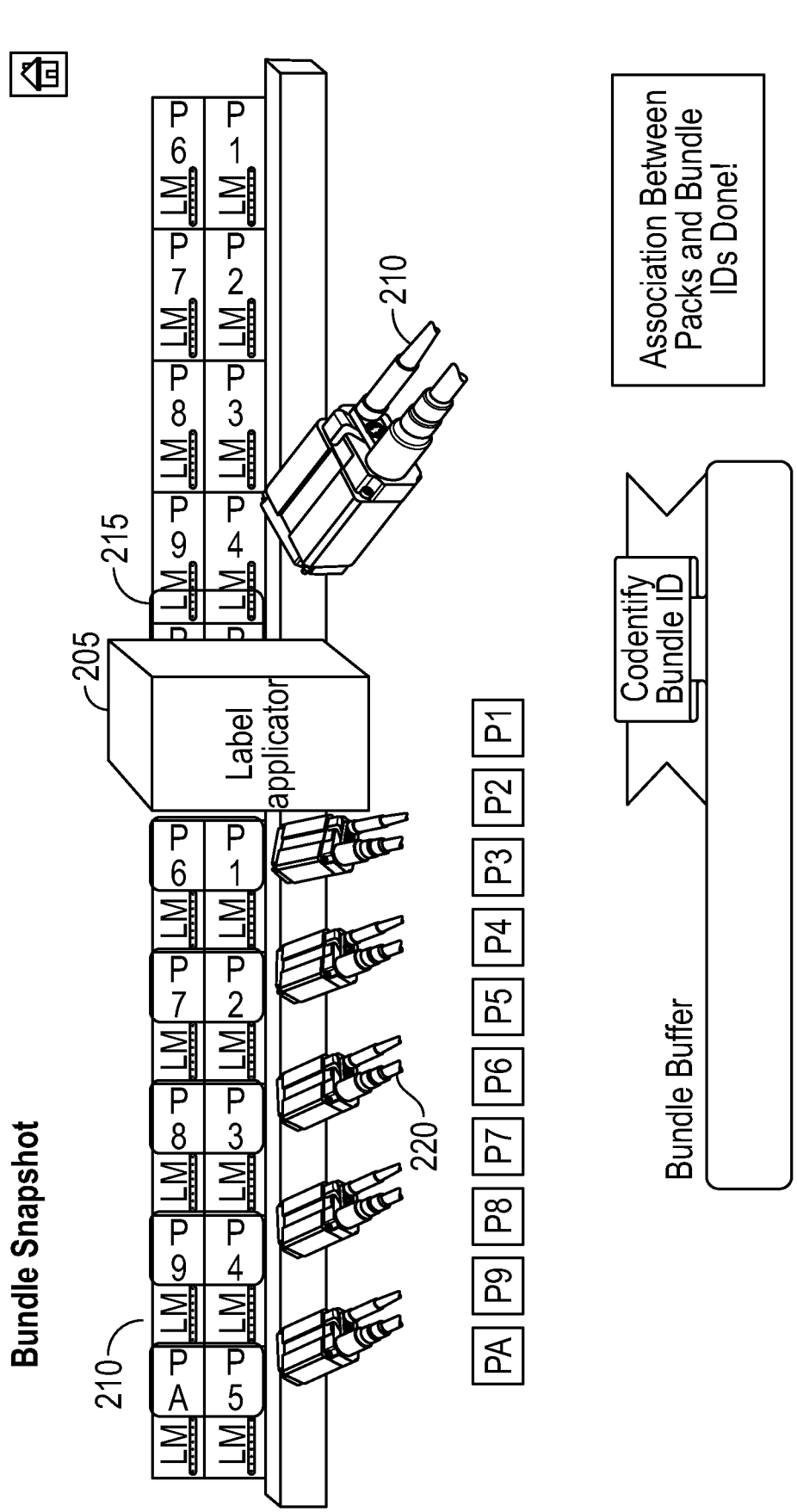
FIG. 2 illustrates an example arrangement of readers a first embodiment.

In an embodiment illustrated in FIG. 2, five cameras (220) may be used as the readers for the individual items, e.g., item (210). In some embodiments, the system can be configured for detecting the unique item identifier codes by five imaging devices, each of the five imaging devices configured to detect two item identifiers located proximate to each other in space. The cameras (220) can read the Dotcodes through the container clear wrap printed on the items and send the information to the item tracking system. The design of the item reader device imager can be optimized for space constraint. The device can be equipped with an integrated high-speed ultrasonic sensor. The objective of the sensor is to detect the presence of a container and to send a signal to all the readers of the device to initiate the snapshot and decoding process. The distance between the device and the sensor can be variable, depending on the linkup. The communication between the device and the system can be Ethernet based.

Reading Process for Containers

The container reader can be configured to decode standard Datamatrix in self-triggering mode. In this embodiment, there is no need of additional sensor to trigger it. With reference to FIG. 2, the reader (210) can be located just after the encoding processor (label applicator and/or printer (205)) of the container and before any container ejection station to read the applied labels (215). The communication between the reader and the system can be Ethernet based.

Container Snapshot Method

Figure 3:
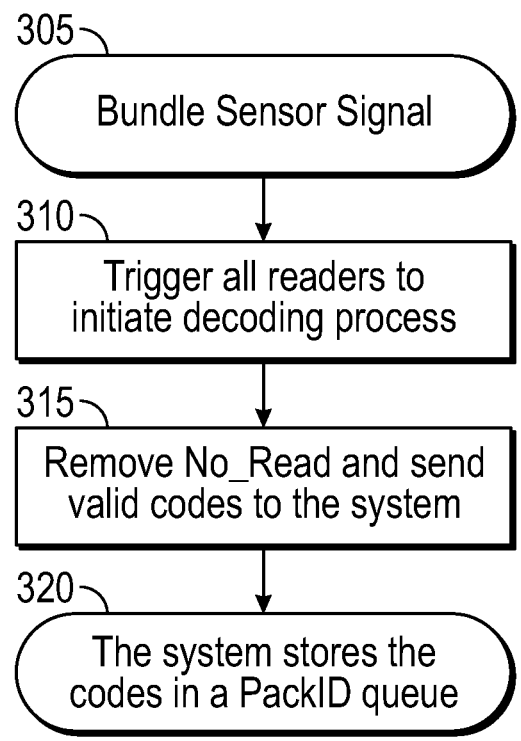
FIG. 3 illustrates an example process for storing item identifiers in a queue.
Figure 4:
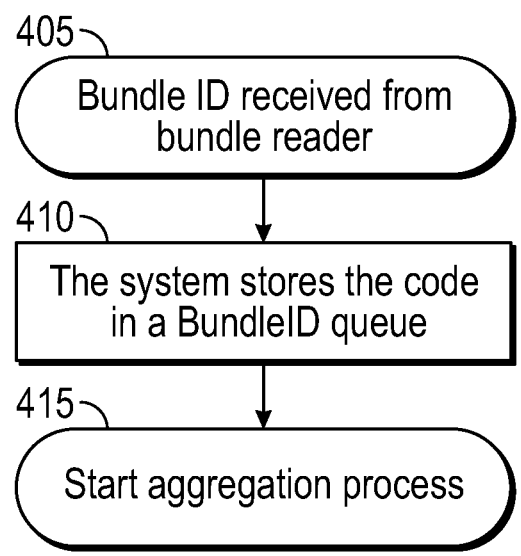
FIG. 4 illustrates an example process for storing container identifiers in a queue.

The method is described below, with reference to FIG. 3. Once a container sensor signal is received (305), item codes are collected. Readers are triggered to initiate a decoding process (310). The system can be configured to remove NO_Reads (described below) and send valid codes for further processing (315) and storage in an item queue (320). After the container label applicator, another reader can read the code of the container, in general encoded by a device such as a Datamatrix and send the information to the item tracking system. Container codes are collected, as illustrated in FIG. 4. Container identifiers are received from the container reader (405), the system stores the codes in a container queue (410), and aggregation is initiated (415). At this stage, the system can create the association between the unique identifier of the container and the items previously captured. The system can be configured to make a link between the items and their container. Data is aggregated and associated using the method illustrated in FIG. 5.

In one embodiment, the system can be configured to include receiving a configurable number of items threshold value, determining whether the threshold number of items was not detected before aggregation of items into a container, and rejecting a container if that threshold value is met by the container. The system can be configured for storing a number of items threshold value; determining whether the container contains greater than the threshold number of items; and if the container contains greater than the threshold number of items, removing duplicate identifiers from among the stored item identifiers associated with the container. In further embodiments, the method can include determining if, after removing duplicate identifiers, the container is associated with greater than ten identifiers; if the container is determined to be associated with greater than ten identifiers, rejecting the container at the production line.

The system can be configured for storing a number of items threshold value; determining whether the number of items in the container is fewer than the threshold number of items; and if the container contains fewer than the threshold number of items, storing null item identifiers in association with the container identifier. In further embodiments, the method can include determining the number of null items identifiers stored in association with the container identifier; and rejecting the container if the number of null items is greater than a predetermined threshold.

Figure 5:
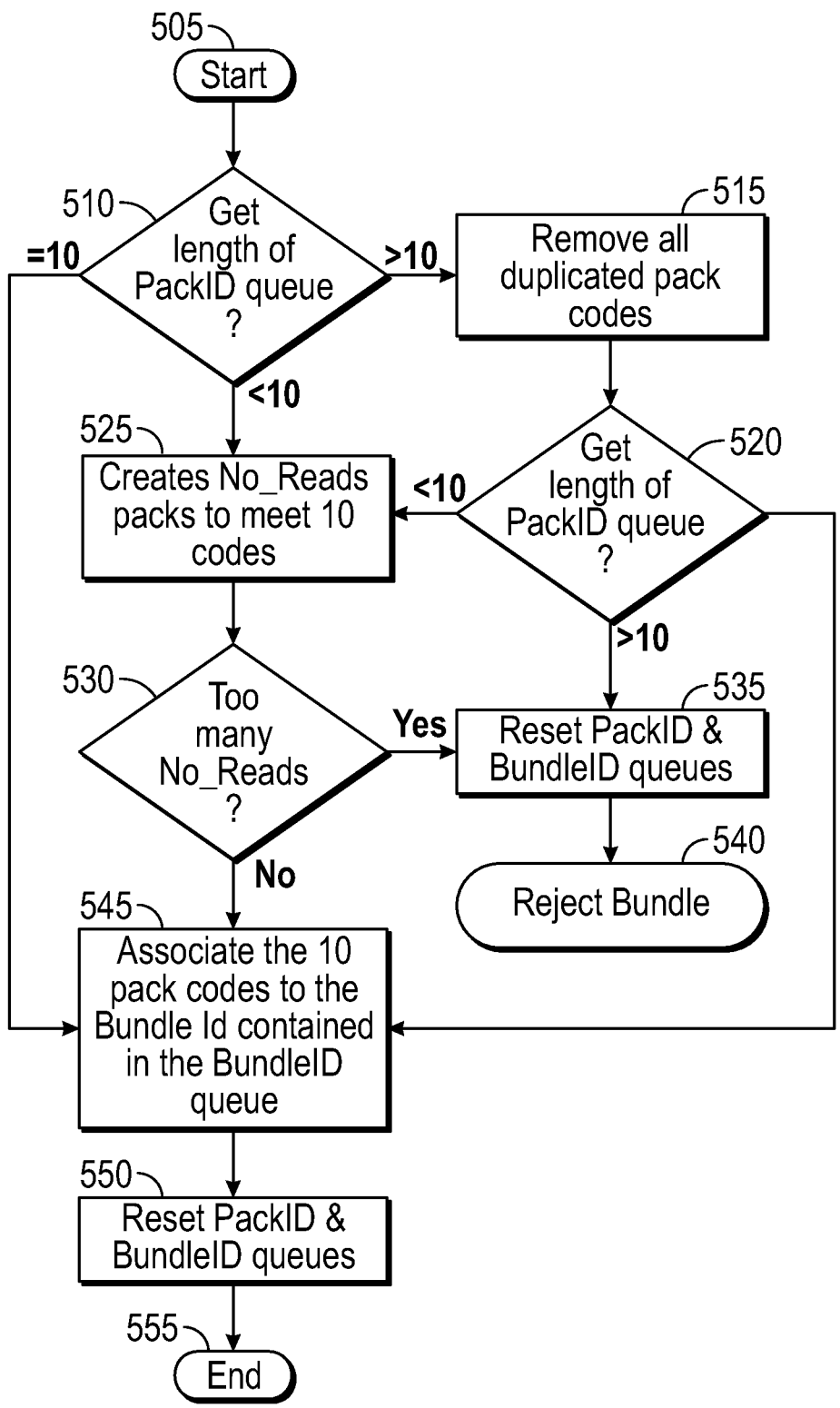
FIG. 5 illustrates an example data aggregation process.

With reference to FIG. 5, the process is initiated (505), and the length of the item queue is determined (510). If the length is greater than a number of items threshold value, e.g., ten, then duplicate item codes are removed (515). The new length of the item queue is determined (520). If the item queue is greater than the number of items threshold value, then the item and container queues are reset (535) and the container is rejected (540). If the item queue is less than the number of items threshold value (520), then NO_Reads are added to the queue as placeholder values to reach the threshold value (525). If the item queue was determined to be less than the number of items threshold value before removal of duplicates (510), then then NO_Reads are added to the queue as placeholder values to reach the threshold value (525). After the creation of NO_Reads (525), the number of NO_Reads is compared to a pre-set threshold number of NO_Reads (530). If the pre-set threshold number of NO_Reads is exceeded, then the item and container queues are reset (535) and the container is rejected (540). If the pre-set threshold number of NO_Reads is not exceeded, then the item identifiers in the queue are associated with the corresponding container identifier in the queue (545), the item and container queues are reset (550) and the process terminates for that container (555). If the length of the item queue is determined (510) to be equal to the number of items threshold value, then then the item identifiers in the queue are associated with the corresponding container ID in the queue (545), the item and container queues are reset (550) and the process terminates for that container. The information captured by the item tracking system will be sent to a database for further information processing.

With reference to FIG. 5, if NO_Reads are generated, the string format can be the following:

NOREAD_PT_LinkupID_yyyyMMdd_HHmmssfff_nn
Linkup ID=Linkup Unique Number
yyyy=current year
MM=current month
dd=current day
HHmmssfff=current time at milliseconds level of detail
nn=packID position in queue A too many No_Reads rule can be configurable by giving the maximum number of items not read that the system accepts without rejecting the container. By default, this value can be set to two. The reject container rule can be linked to an alarm displaying the cause of the rejection.

Virtual Container Embodiment

According to a second embodiment, in the virtual container embodiment, the system reads the identifiers on a set of items at an arbitrary time after the items are physically aggregated into a container. The virtual container embodiment does not require proximity in time or space between reading item identifiers before a container label applicator and reading the container identifier. The virtual container snapshot embodiment can be used if clear-wrap is used in the container making process. In some embodiments, the method can include detecting the unique item identifiers on the set of items by imaging the identifiers through a clear-wrap binding the set of items into the container. In a preferred embodiment, the items have a unique code printed on them, containers have a unique code printed on them, and a container ejection station is available. As non-limiting examples, Dotcode can be used for writing item codes and Datamatrix can be used for writing container codes.

Figure 6:
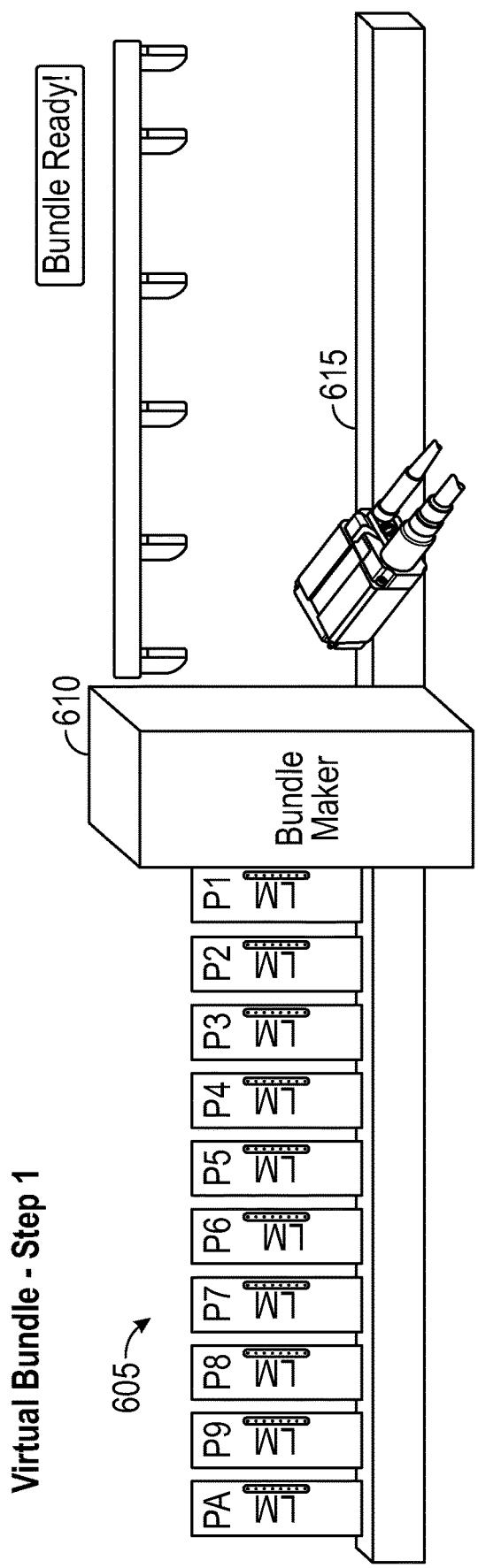
FIG. 6 illustrates an example architecture for a second embodiment.

According to one embodiment, as illustrated in FIG. 6, one or more item readers (615) can be located in a container (or bundle) conveyor to capture the item codes on items (605). The item readers can be placed either before the container maker, or in a preferred embodiment, after the container maker (610). The readers can include, in some embodiments, six optical sensors (five for item code reading, and one for virtual container complete signal). In some embodiments, the method can include detecting the unique item identifiers by five imaging devices, each of the five imaging devices configured to detect two item identifiers located proximate to each other in space. In further embodiments, the method can include detecting if a container complete signal is received, and generating the container complete signal based on the detection of a predetermined size of empty space between multiple containers. The method can further include determining if the container complete signal is received, then determining if the number of detected item identifiers is greater than, equal to, or less than a predetermined quantity.

The reading code process can be triggered by detection of items, using one or more of the optical sensors. The reading of a complete container is stored in the electronic data store as a virtual container, and placed in a queue of virtual containers. In the container conveyor area, an empty space may be used to separate each container, for example of at least 60 millimeters. The communication between the reader and the system can be Ethernet based. In a preferred embodiment, the readers can be triggered by external sensors. As described in more detail below, when the container is ready, the system takes the first set of items of the item buffer (e.g., ten items) and creates a virtual container. A unique and temporary identifier is used to identify the virtual container. An example virtual container identifier may be in the form of "XAF32". After a label has been applied to a container, a first reader reads one item code in the container. The system then searches this code in the collection of stored virtual containers. Upon finding a match, the system associates the items of the virtual container with the container identifier having been read by one of the readers.

Figure 7:
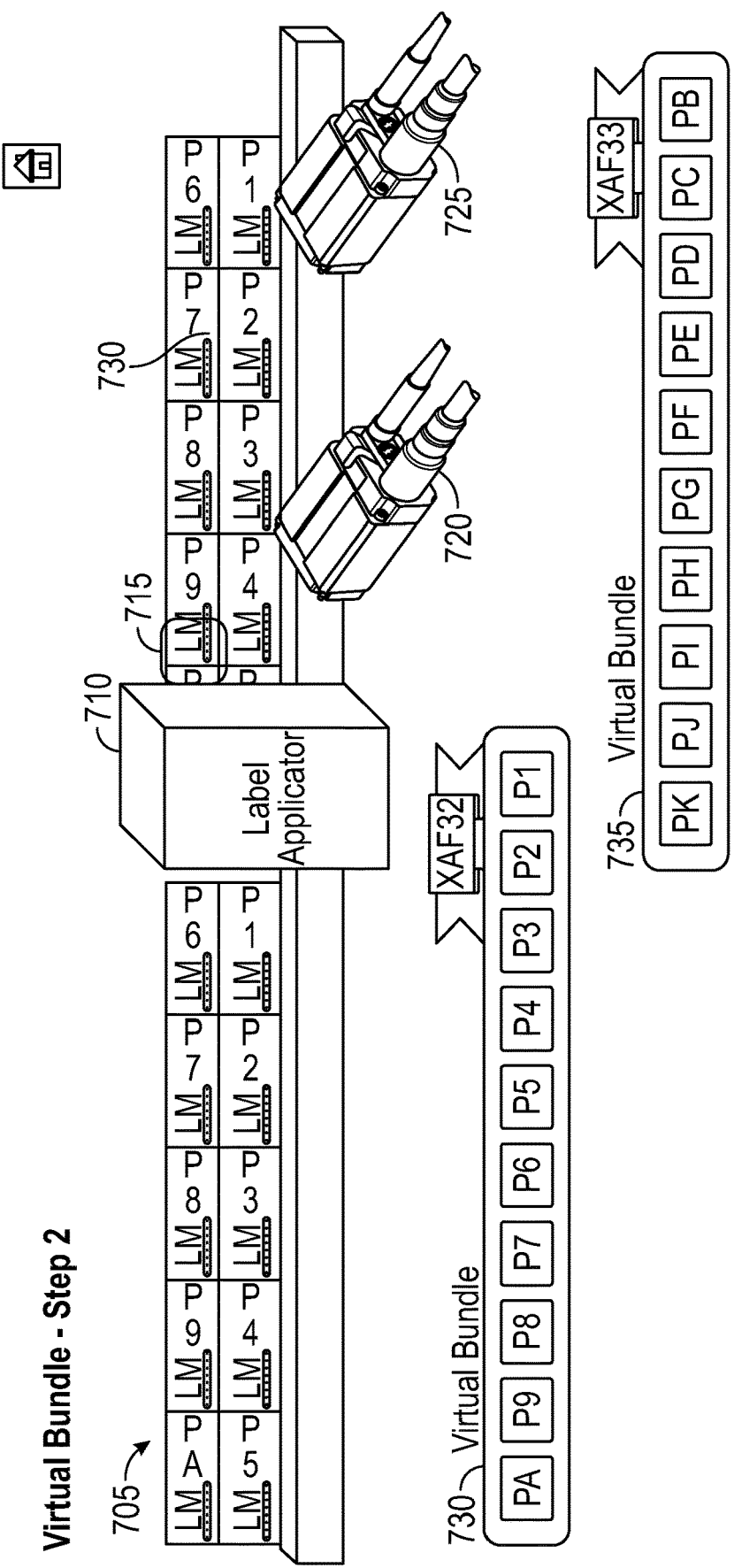
FIG. 7 illustrates an example arrangement of readers for a second embodiment.

As illustrated in FIG. 7, one or more additional readers (720) and (725) can be located after a container label applicator (710) has applied labels to the containers (705). In a preferred embodiment, two readers are used: one reader (725) to read the item code of an item in the container (730) (used as a virtual container identifier) and the second reader (720) to read the code of the container (715) (container ID reader). The virtual container identifier reader can be triggered by an external sensor (virtual container sensor) and can decode Dotcode. The virtual container identifier be configured according to the same requirement as the item reader described above. The container reader can be configured to decode standard Datamatrix in self-triggering mode and an additional sensor is not required to trigger it. In some alternative embodiments, an external sensor trigger could be used. The readers can be located just after the encoding processor (label applicator or printer) of the container and just before any container ejection station. The communication between the readers and the system can be Ethernet based. As described in more detail below, the structure of example virtual containers (730) and (735) are illustrated in FIG. 7. The method can comprise detecting the unique item identifiers on the set of items at a location that is proximate in space or time to the step of mechanically allocating two or more items to be aggregated in a container or detecting the unique item identifiers on the set of items at a location that is not proximate in space or time to the step of mechanically allocating two or more items to be aggregated in a container.

According to one embodiment, the method can include generating a set of unique item identifier codes, each identifier code corresponding to a specific item in a set of items; at a production line, uniquely identifying multiple items by marking the multiple items with the corresponding unique item identifier codes; at the production line, mechanically aggregating two or more items into a container; detecting the unique item identifier codes on the set of items aggregated into the container and transmitting the detected unique item identifier codes to a processor; electronically storing the detected unique item identifier codes in a data store and associating the detected unique identifier codes with a temporary identifier for the container; at the production line, uniquely identifying the container by marking the container with a unique container identifier; detecting the unique container identifier on the container and transmitting the detected unique container identifier to the processor; detecting one item identifier of the set of items aggregated in the container and transmitting the detected item identifier to the processor; determining unique item identifiers for multiple items in the container based on the detected unique item identifier associated with the temporary identifier for the container; and in the electronic data store, associating the determined unique item identifiers for multiple items in the container with the detected unique container identifier.

Figure 8:
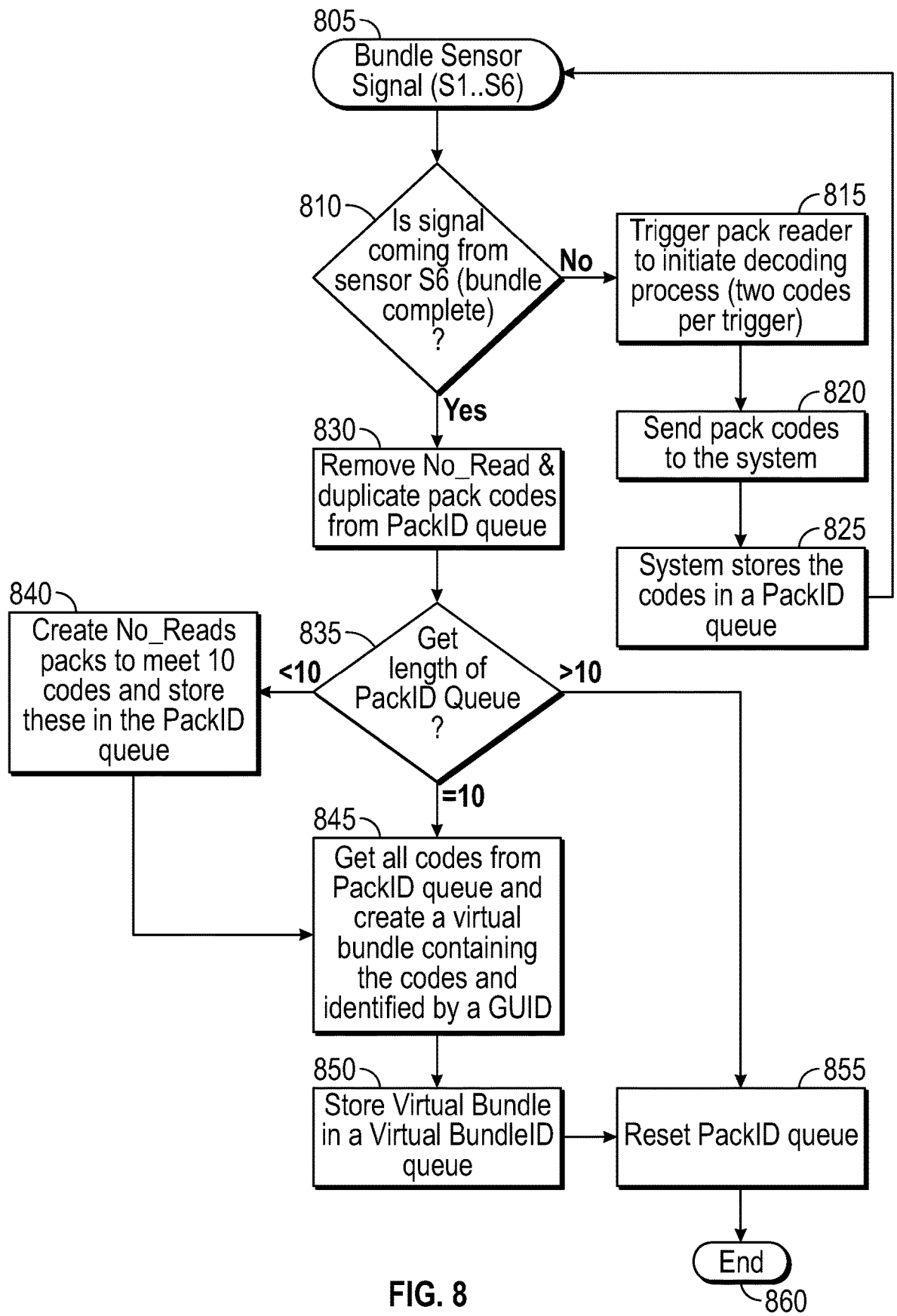
FIG. 8 illustrates an example process for collecting item identifiers.

A process for collecting item identifiers for the virtual container embodiment is illustrated in FIG. 8. As in initial step, a container sensor signal is detected (805). It is determined whether the signal is from a container complete sensor (810). If the container is not complete in (810), then an item reader can be triggered to initiate a decoding process using two codes per trigger (815). The item codes are sent to the system (820), and the system stores the item codes in an item identifier queue (825). If the signal is from a container complete sensor (810), then NO_Read (generated as above) and duplicate item codes are removed from the item queue (830). The length of the item queue is determined (835). If the length of the item queue is greater than a preset value, the item identifier queue is reset (855). If the length of the item queue is less than a preset value, then NO_Reads are added to the queue to reach the preset value (840). If the length of the item queue is equal to the preset value (e.g., ten), then all identifiers from the item queue are retrieved and a virtual container is created for the items and assigned a unique identifier (845). The virtual container is then stored in a virtual container queue (850), the item identifier queue reset (855), and the process terminated (860).

Figure 9:
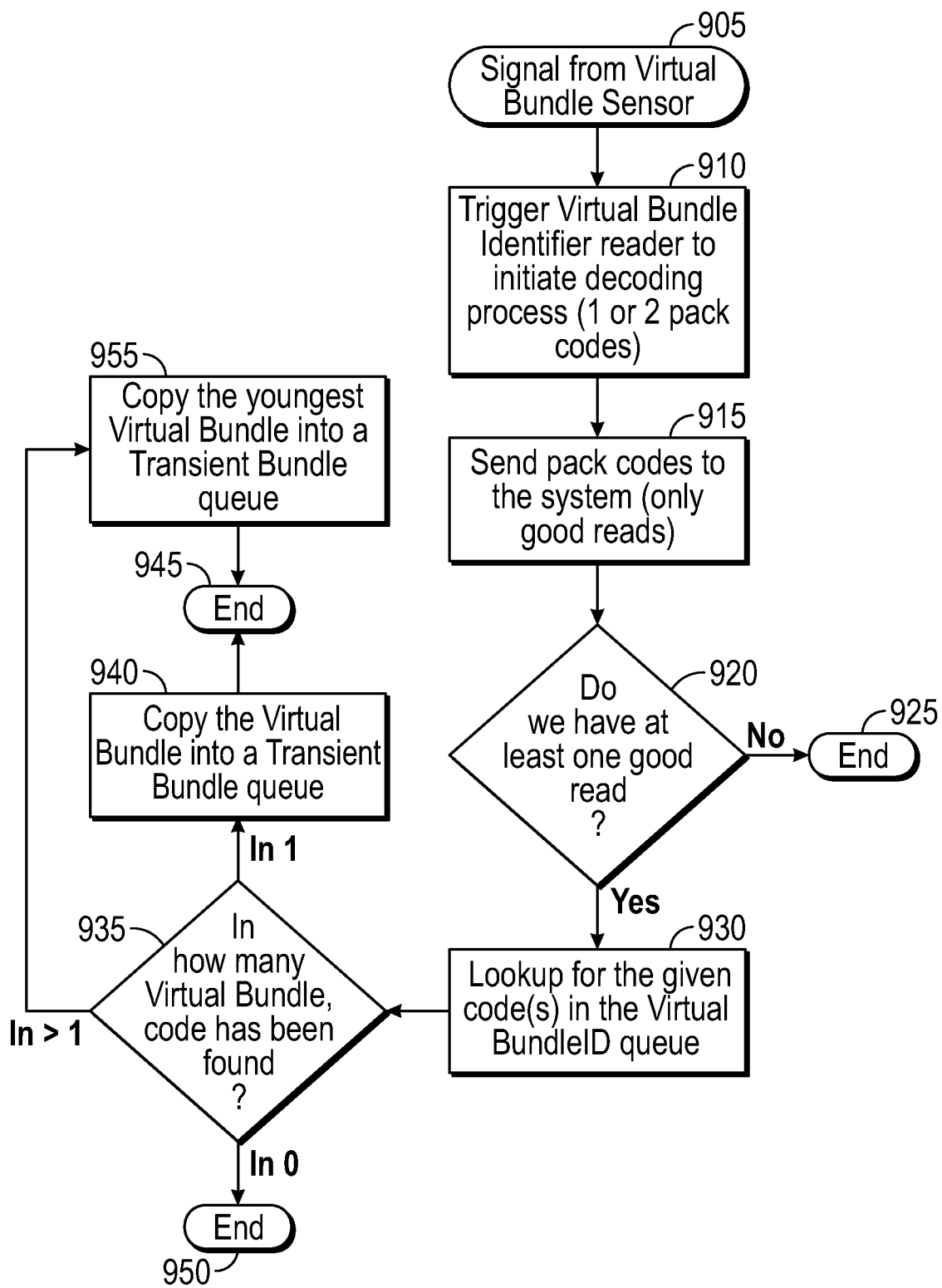
FIG. 9 illustrates an example process for collecting container identifiers.

A process for collecting container identifiers is illustrated in FIG. 9. First, a signal from the virtual container sensor is detected (905). In response, the virtual container identifier reader is triggered to initiate a decoding process on one or more item codes (910). The good item codes are sent to the system (915). If there is no good item code read (920), the process terminates (925). If there is at least one good read (920), a lookup is performed for the identifier in the virtual container queue (930). The number of virtual containers in which the item code appears is determined (935). If the item code appears in no virtual containers, the process is terminated (950). If the item code appears in at least one virtual container, then the virtual container is copied into a transient container queue (940) and the process is terminated (945). If the item code appears in more than one virtual container, then the youngest virtual container is copied into the transient container queue (955) and the process is terminated (945).

Figure 10:
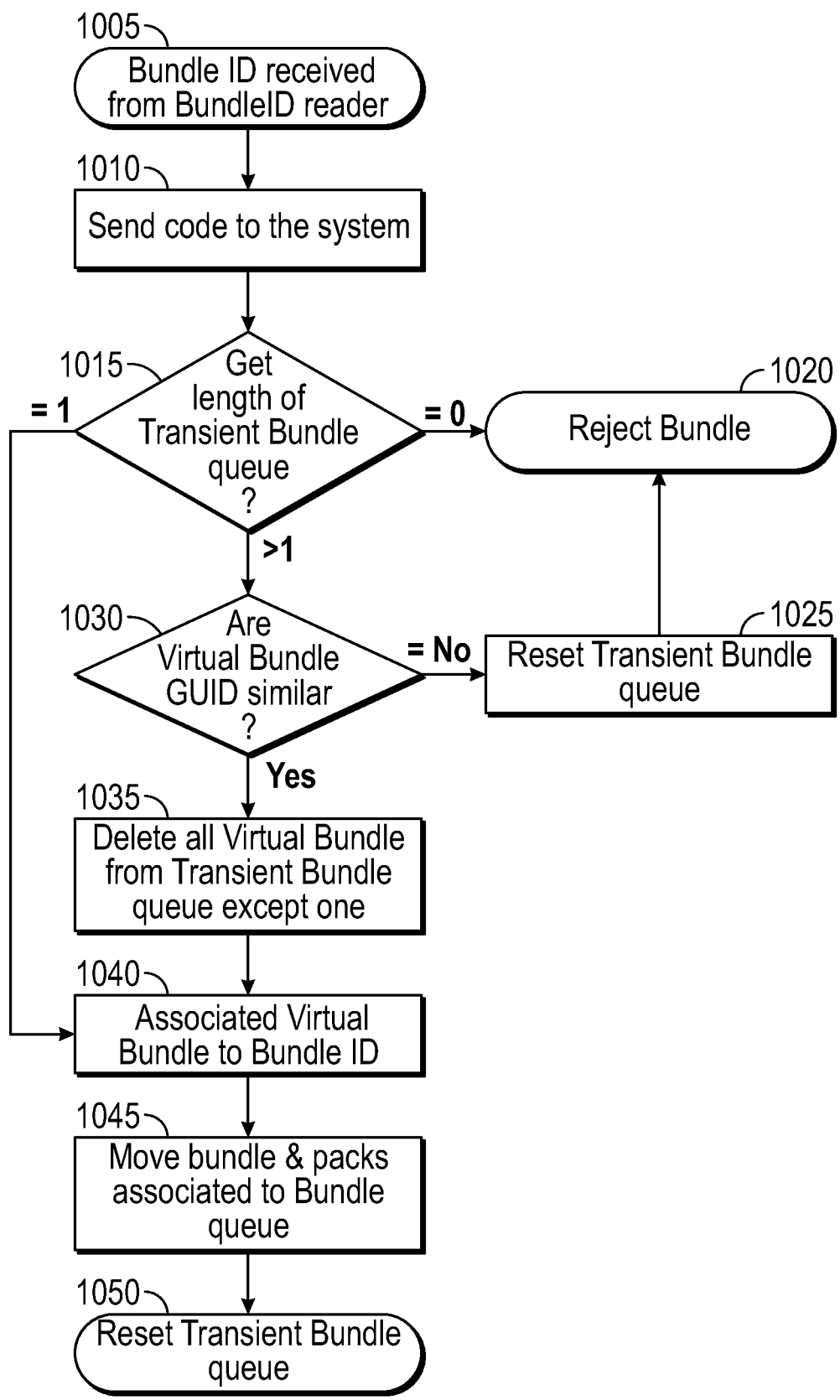
FIG. 10 illustrates an example data aggregation process.

An example aggregation process is illustrated in FIG. 10. A container identifier is received from a container identifier reader (1005) and the identifier is sent to the system (1010). The length of the transient container queue is determined (1015). If the length is zero, the container is rejected (1020). If the length is equal to one, the virtual container is associated to the container identifier (1040), the container and associated items are moved to a container queue (1045) and the transient container queue is reset (1050). If the length of the transient container queue is greater than one (1015), then a determination is made whether the virtual container identifiers are similar (1030). If the identifiers are not similar, the transient container queue is reset (1025) and the container rejected (1020). If the virtual container identifiers are similar (1030), then all virtual containers are deleted from the transient container queue except one (1035), and the process resumes by associating the virtual container to the container identifier (1040). The method can include associating the determined unique item identifiers for multiple items in the container with the detected unique container identifier in a relational database system.

As illustrated, after the container label applicator, one reader can read an item identifier, and one reader can read a container identifier. The system can then reference the known item identifier and associate that item identifier with the virtual container created before the label applicator. Based on the association from the known item to the other items in the virtual container, the system can then associate the container identifier to all of the item identifiers in the virtual container.

With reference to FIG. 8, if NO_Reads are generated, the string format can be the following:
NOREAD_PT_LinkupID_yyyyMMdd_HHmmssfff_nn
Linkup ID=Linkup Unique Number
yyyy=current year
MM=current month
dd=current day
HHmmssfff=current time at milliseconds level of detail
nn=packID position in queue The too many No_Reads rule can configurable by giving the maximum number of items not read that the system accepts without rejecting the container. By default, this value is set to two. A process cleaning the virtual containers from the virtual container identifier queue can be implemented to remove items older than a configurable number of hours. As a non-limiting example, the default value can be set to four hours. The reject container rule can be linked to an alarm displaying the cause of any item or container rejection.

Item Shot Variant A

According to a third embodiment, Item Shot Variant A can be used when the material used for the containers is not transparent. Non-limiting examples of non-transparent container materials may be display carton and paper. Item Shot Variant A may also be used if the line topology does not allow the implementation of the container snapshot or virtual container embodiments, described above. For example, this method can be used when the step of mechanically aggregating the items into a container further comprises enclosing the items using a non-transparent material or the step of mechanically aggregating the items into a container further comprises enclosing the items using a material which prevents the item identifiers from being read optically.

Figure 11:
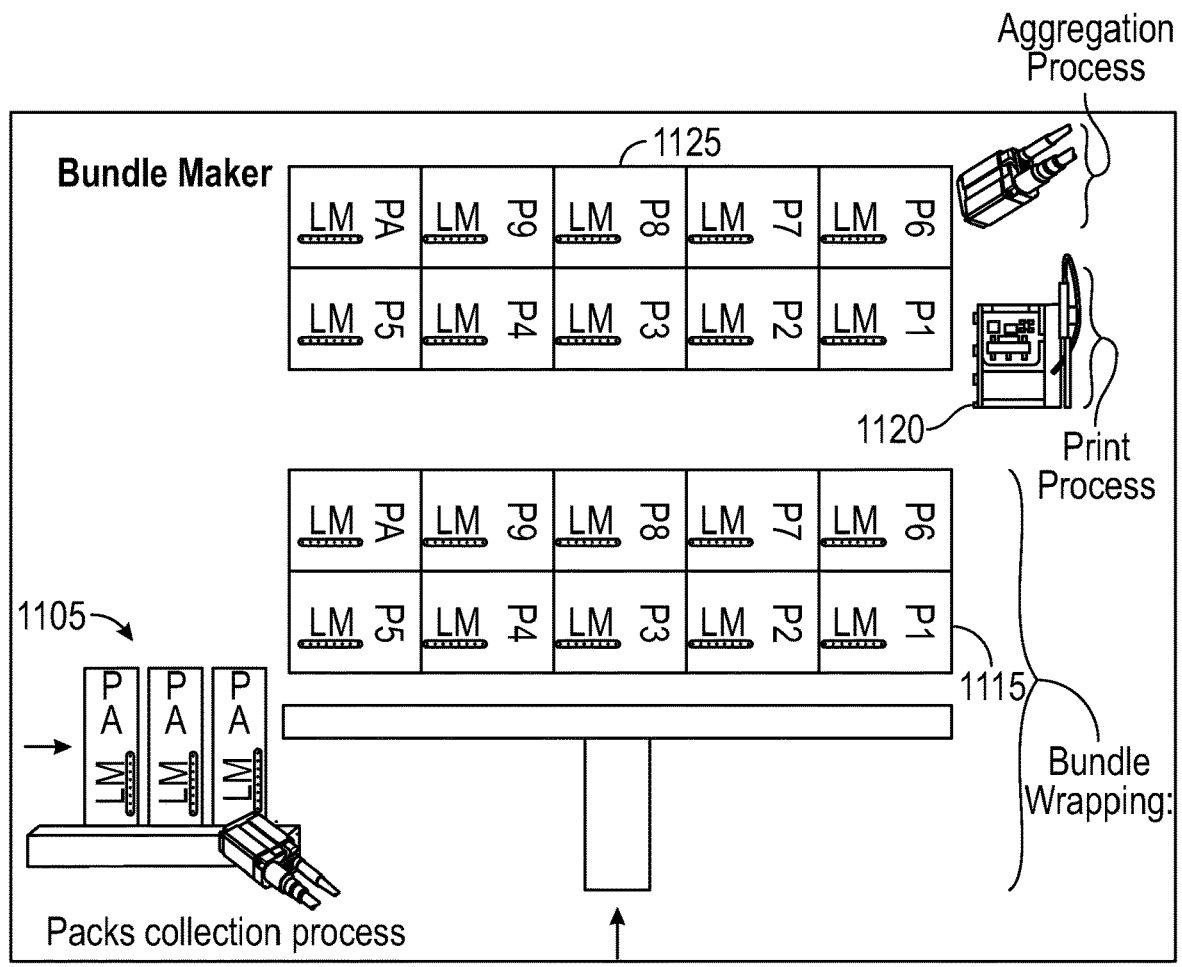
FIG. 11 illustrates an example architecture for a third embodiment.

According to the Item Shot Variant A embodiment, a reader is installed at the entrance of the container maker. An overview of the embodiment is illustrated in FIG. 11. When a container arrives to the label applicator, a label is applied to it and a reader captures the code printed on the label (container code). A container code is printed on the container or on a label. A good read signal can be sent to the item tracking system and the aggregation is done between the oldest virtual container and the container code. The container good read or ejection signals can be managed by the container maker and sent to the item tracking system.

In one embodiment of a computer-implemented method for identifying manufactured products in containers, each container suitable for containing two or more items, the method can include generating a set of unique item identifier codes, each identifier code corresponding to a specific item in a set of items; at a production line, uniquely identifying multiple items by marking the multiple items with the corresponding unique item identifier codes; detecting the unique item identifier codes on the set of items and transmitting the detected unique item identifier codes to a processor; storing the detected unique item identifier codes in an item identifier buffer; if the number of detected unique item identifier codes in the buffer is equal to or greater than a predetermined number of item identifier codes, associating the item identifier codes with each other and storing the associated item identifier codes as a virtual container; at the production line, mechanically aggregating two or more items in a container; at the production line, uniquely identifying the container by marking the container with a unique container identifier; detecting the unique container identifier on the container on a conveyor and transmitting the detected unique container identifiers to the processor; and associating container identifiers of containers on the conveyor with virtual containers of item identifier codes.

As illustrated in FIG. 11, individual items (1105) are wrapped into containers (1115) and item codes are stored in virtual containers. Then, the physical containers are placed on a conveyor going to the container label applicator and print process (1120). The maximum number of containers in the conveyor is fixed and known by the item tracking system. Each container is located in a dedicated physical slot of the conveyor. On the conveyor, each container can be separated by a physical barrier, such as a slot. Slots can be detected to be empty or filled and a slot buffer managed accordingly. At the printing process, a good read can be detected or ejection can be performed. In the aggregation process (1125), the container code is read and items from the virtual container are linked to the container code, which is then printed on the container. The container code reading process can be initiated by an internal signal of the container maker. The container ready signal can be provided by an internal signal of the container maker. A container ejection (or empty slot) signal can be provided by an internal signal of the container maker.

Figure 12:
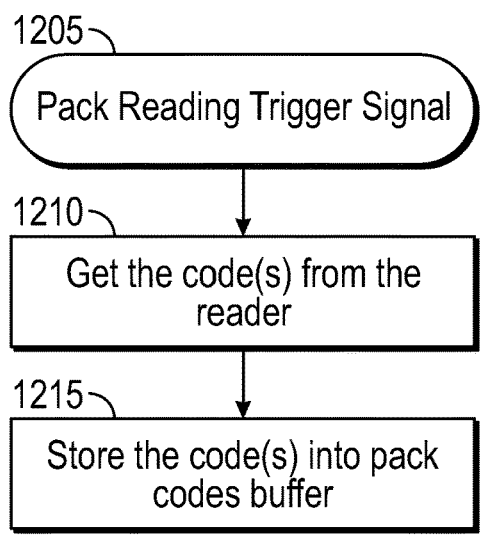
FIG. 12 illustrates an example process for storing item identifiers in a buffer.

As illustrated in FIG. 12, in the item collection process, upon an item reading trigger signal (1205), item codes are read (1210) and stored in a buffer (1215) using a reader located just before the pusher. The reader can collect the identifiers for items entering in the container maker and store the item identifiers in a buffer. The item code reading process can be initiated by a sensor or internal signal of the container maker. The communication between the item reader and the system can be Ethernet based. The item reader can be triggered by an external signal. The reader position can be set ideally at the last item position of the container. If this is not possible, an offset can be configurable and managed by the item tracking system.

Figure 13:
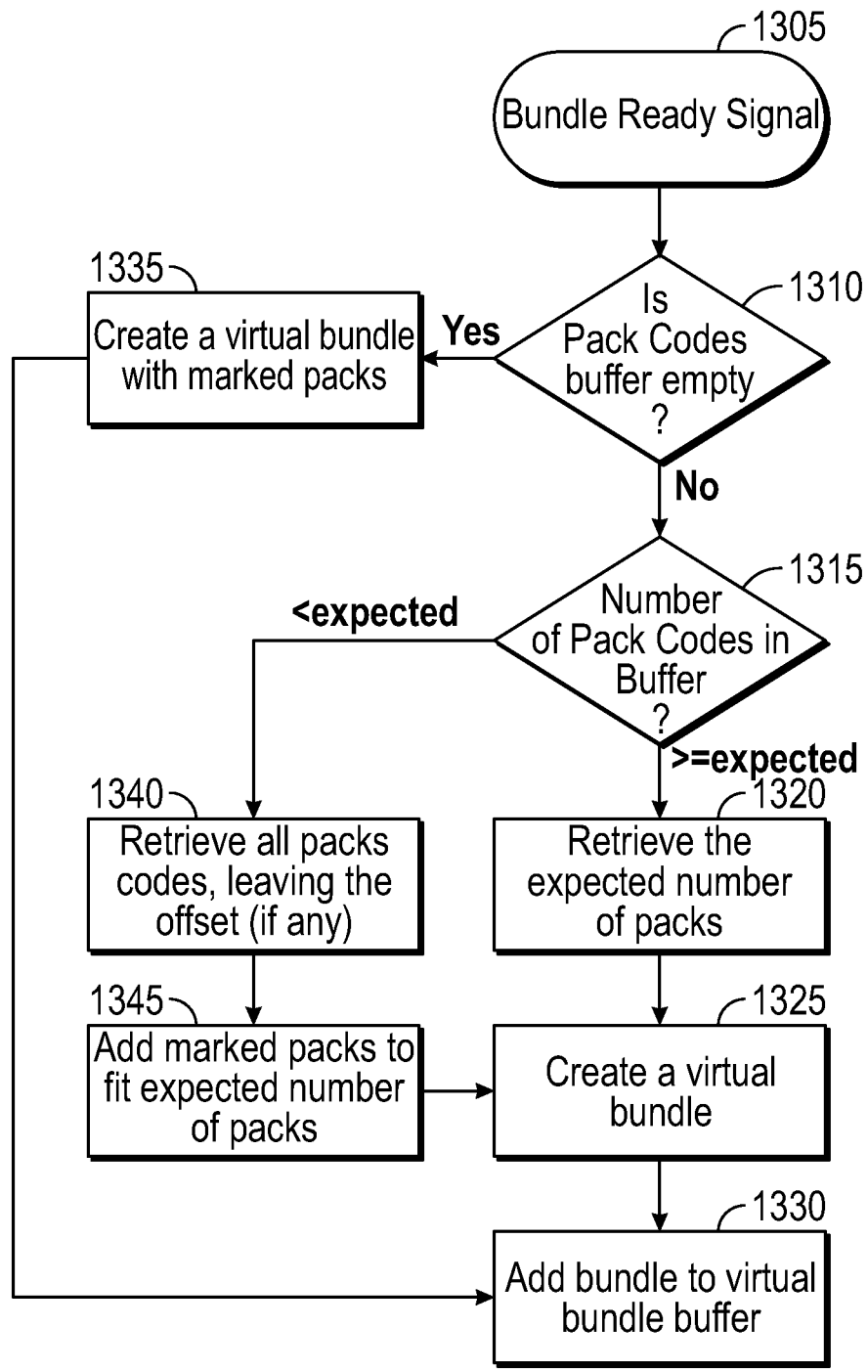
FIG. 13 illustrates an example process for item code reading.

The item code reading process is illustrated in FIG. 13. When the system receives a container complete signal, a new virtual container is created with the n latest collected item codes and the new virtual container is added to a virtual container buffer (where n is a fixed number that can be set in the item tracking system). In some example embodiments, n is set to be ten. When a container ready signal is received (1305), it is determined if the container code buffer is empty (1310). If the buffer is empty, then a virtual container is created with the marked items (1335) and the virtual container is added to the virtual container buffer (1330). If the item code buffer is not empty (1310), the number of items in the buffer is compared to the expected number of items. If the number is greater than expected, then the system retrieves all item codes, leaving the offset, if any (1340), adds marked items to fit the expected number of items (1345), creates a virtual container (1325), and the virtual container is added to the virtual container buffer (1330). If the number is less than or equal to the expected number, then the system retrieves the expected number of items (1320), creates a virtual container (1325), and adds the virtual container to the virtual container buffer (1330).

Figure 14:
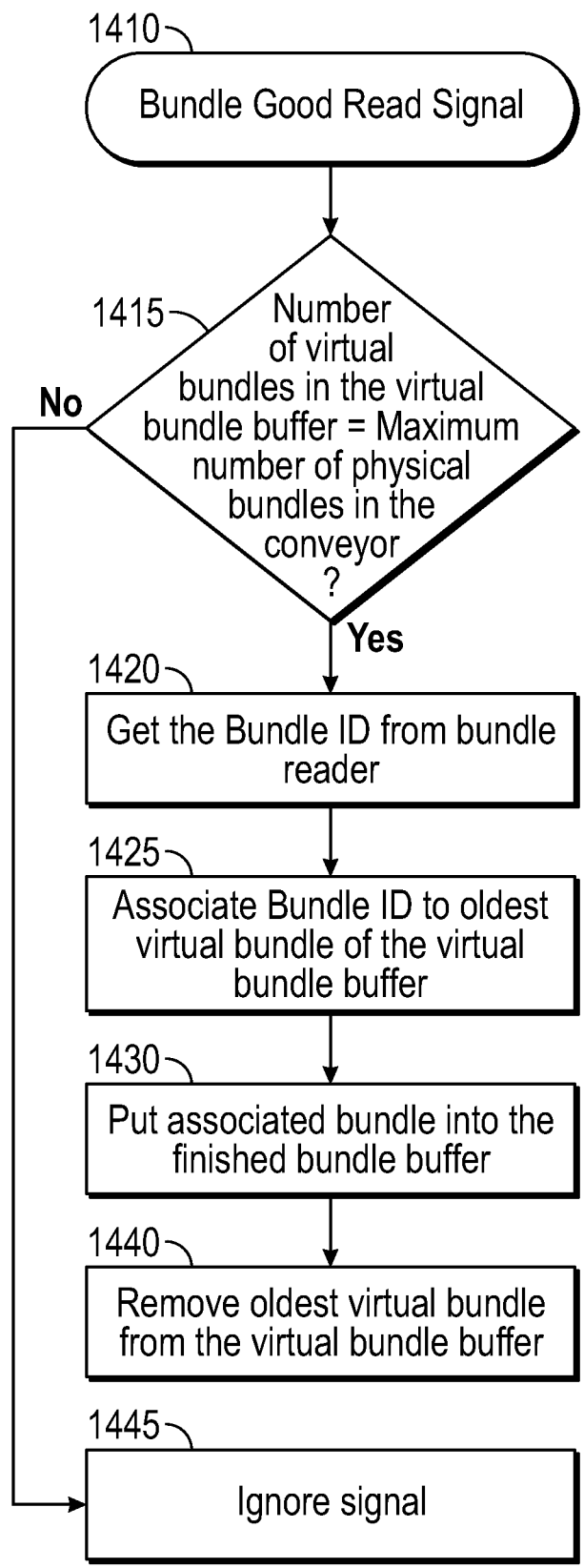
FIG. 14 illustrates an example process for virtual container collection and aggregation.

The virtual container collector and aggregation process is illustrated in FIG. 14. In the aggregation process, a container code is read and items from virtual container are linked to container code. According to this embodiment, aggregation and printing can be performed in or closely in association with the container maker. Upon receipt of a container good read signal (1410), the system determines if the number of virtual containers in the virtual container buffer equals the maximum number of physical bundles in the conveyor (1415). If the values are not equal, the signal is ignored (1445). If the signals are equal, then the container ID is obtained from the container reader (1420), the container ID is associated to the older virtual container of the virtual container buffer (1425), the associated container is stored in the finished container buffer (1430), and the oldest virtual container is removed from the virtual container buffer (1440).

The method can further include electronically storing a value representing a pre-determined maximum number of physical containers on a conveyor, and if a number of container identifiers on the conveyor is equal to a pre-determined maximum number of containers in a conveyor, associating the oldest virtual container with the oldest container.

Figure 15:
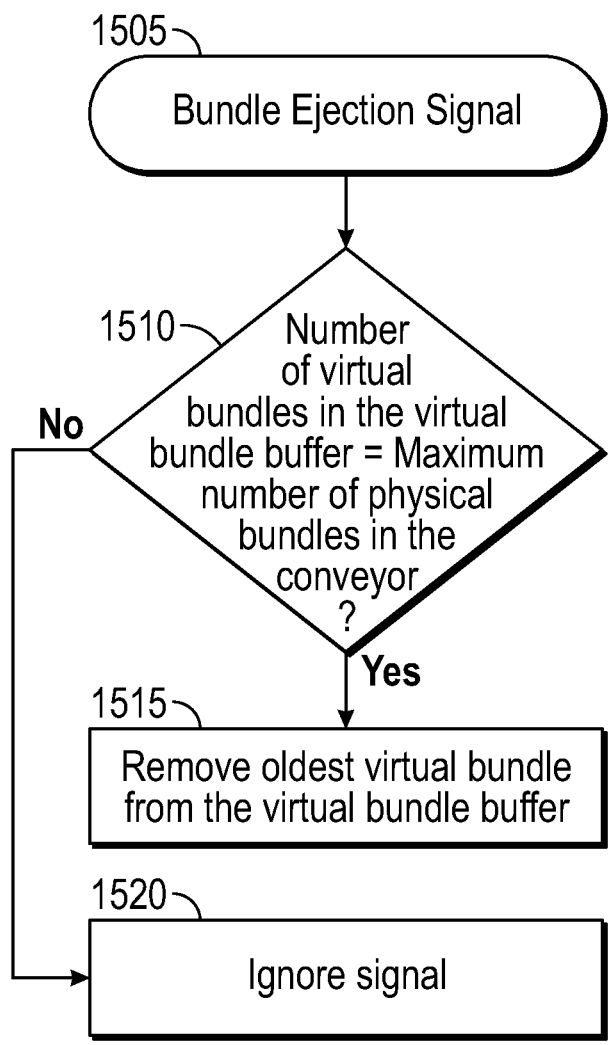
FIG. 15 illustrates an example process for container ejection.

The container ejection process is illustrated in FIG. 15. If an empty slot of the conveyor is coming to the label applicator, an ejection signal can be sent to the item tracking system and the oldest virtual container removed from the virtual container buffer. Upon receipt of a container ejection signal (1505), the system determines if the number of virtual containers in the virtual container buffer equals the maximum number of physical containers in the conveyor (1510). If the values are not equal, the signal is ignored (1520). If the signals are equal, the oldest virtual container is removed from the virtual container buffer (1515).

In some embodiments, the system can be configured so that each item has a unique code bottom printed (using, for example, Dotcode), each container has a unique code printed (using, for example, Datamatrix SGTIN), a container ejection station exists, and the number of containers in the conveyor going to the label applicator is predetermined. The container reader can be configured to decode standard Datamatrix given an external signal (external trigger). The reader can be located just after the encoding processor (label applicator or printer) of the container and just before the container ejection station (if one is present). The communication between the reader and the system can be Ethernet based.

Item Shot Variant B

Figure 16:
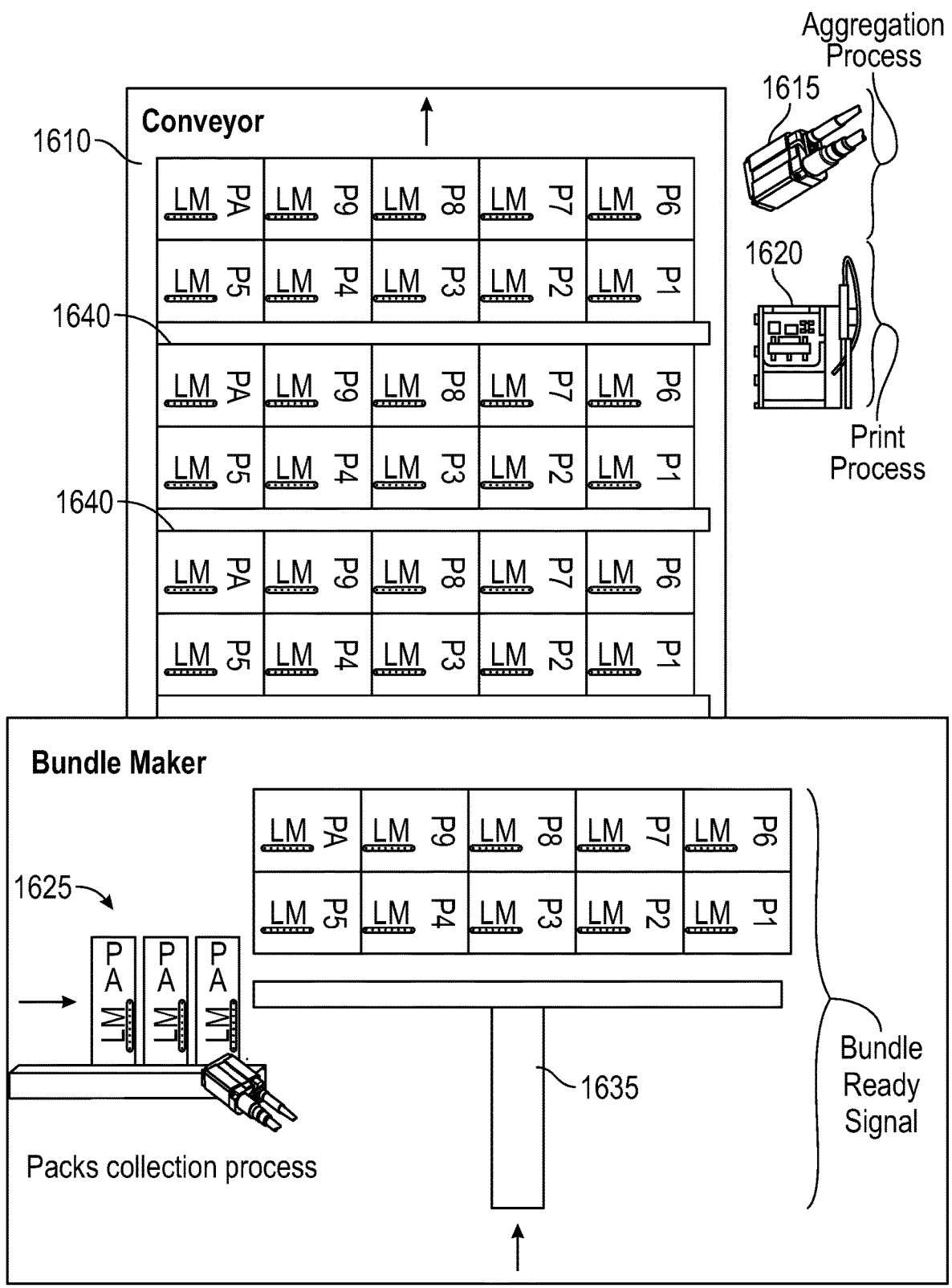
FIG. 16 illustrates an example architecture for a fourth embodiment.

According to a fourth embodiment based on Item Shot Variant A, on the conveyor, each container is separated by a physical barrier (slot). With reference to FIG. 16, the system stores the state (empty or filled) of each slot (1640) on the conveyor (1610) and this information can be shared to item tracking to manage the slot buffer. At printing process (1620), the system can send to item tracking an indication of good read or ejection. This embodiment can be used when mechanically aggregating the items into a container further comprises enclosing the items using a non-transparent material.

With reference to FIG. 16, at the container maker, in the item collection process, item codes are read (1625) and stored in a buffer. The camera for reading the codes can be located just before the pusher (1635). The ten oldest item codes are stored in a virtual container and added to a virtual container buffer when a container ready signal is generated. After the container maker, a container code is printed (1620) on the container or on a label in a print process. In an aggregation process (1615), a container code is read and items from virtual container are linked to the container code.

In one embodiment of a computer-implemented method for identifying manufactured products in containers, each container suitable for containing two or more items, the method can include generating a set of unique item identifier codes, each identifier code corresponding to a specific item in a set of items; at a production line, uniquely identifying multiple items by marking the multiple items with the corresponding unique item identifier codes; detecting the unique item identifier codes on the set of items and transmitting the detected unique item identifier codes to a processor; storing the detected unique item identifier codes in an item identifier buffer; if the number of detected unique item identifier codes in the buffer is equal to or greater than a predetermined number of item identifiers, associating the item identifier codes with each other and storing the associated item identifiers as a virtual container; at the production line, mechanically aggregating two or more items in a container; at the production line, uniquely identifying the container by marking the container with a unique container identifier; detecting the unique container identifier on the container on a conveyor based on a demarcation between adjacent containers; transmitting the detected unique container identifiers to the processor; and associating container identifiers of containers on the conveyor with virtual containers of item identifiers. In further embodiments, the demarcation between adjacent containers can be a physical barrier, a slot, or a space.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A computer-implemented method for identifying manufactured products in physical containers, each physical container suitable for containing two or more items, the method comprising the steps of:

generating a set of unique item identifier codes, each unique item identifier code corresponding to a specific item in a set of items;

at a production line, uniquely identifying multiple items by marking the multiple items with the corresponding unique item identifier codes;

at the production line, mechanically aggregating two or more items for inclusion into a physical container by a container maker;

detecting, with one or more item readers placed either before or after the container maker, the unique item identifier codes on the set of items aggregated, or to be aggregated, into the physical container, and transmitting the detected unique item identifier codes to a processor;

electronically storing the detected unique item identifier codes in a data store;

generating a virtual container having a temporary identifier which is not required to be identical to any physical container identifier, and associating the detected unique item identifier codes with the temporary identifier for the virtual container;

at the production line, uniquely identifying the physical container by marking the physical container with a unique container identifier;

detecting, with a reader, the unique container identifier on the physical container and transmitting the detected unique container identifier to the processor;

detecting, with a reader, at least one unique item identifier code of the set of items after the set of items has been aggregated in the physical container, and transmitting the detected at least one unique item identifier code to the processor;

determining unique item identifier code for multiple items in the physical container based on the detected at least one unique item identifier code associated with the temporary identifier for the virtual container; and in the electronic data store, associating the determined unique item identifier codes for multiple items in the physical container with the detected unique container identifier.

2. The method of claim 1, further comprising detecting the unique item identifier codes on the set of items by imaging the unique item identifier codes through a clear-wrap binding the set of items into the physical container.

3. The method of claim 1, further comprising detecting the unique item identifier codes on the set of items at a location that is proximate in space or time to the step of mechanically allocating two or more items to be aggregated in the physical container.

4. The method of claim 1, further comprising detecting the unique item identifier codes on the set of items at a location that is not proximate in space or time to the step of mechanically allocating two or more items to be aggregated in the physical container.

5. The method of claim 1, further comprising detecting the unique item identifier codes by five imaging devices, each of the five imaging devices configured to detect two unique item identifier codes located proximate to each other in space.

6. The method of claim 1, further comprising detecting if a container complete signal is received.

7. The method of claim 6, further comprising generating the container complete signal based on a detection of a predetermined size of empty space between multiple physical containers.

8. The method of claim 6, further including determining if a number of detected unique item identifier codes is greater than, equal to, or less than a predetermined quantity.

9. The method of claim 1, further comprising collecting item identifiers through:

detecting a container sensor signal;

determining whether the container sensor signal is from a container complete sensor;

if the physical container is not complete, then triggering an item reader to initiate a decoding process using two codes per trigger and sending item codes to the processor, and storing the item codes in an item identifier queue;

if the signal is from a container complete sensor, then NO_Read and duplicate item codes are removed from the item queue;

determining the length of the item queue;

if the length of the item queue is greater than a preset value, the item identifier queue is reset;

if the length of the item queue is less than a preset value, then NO_Reads are added to the queue to reach the preset value;

if the length of the item queue is equal to the preset value, then identifiers from the item queue are retrieved and the virtual container is created for the items and assigned a unique identifier;

storing the virtual container in a virtual container queue; and resetting the item identifier queue.

10. The method of claim 1, further comprising a process for collecting container identifiers through:

detecting a signal from a virtual container sensor;

in response, a virtual container identifier reader is triggered to initiate a decoding process on one or more item codes;

sending good item codes to the processor;

if there is no good item code read, terminating the decoding process;

if there is at least one good item code read, performing a lookup for the identifier in a virtual container queue;

determining a number of virtual containers in which the item code appears;

if the item code appears in no virtual containers, terminating the decoding process;

if the item code appears in one virtual container, then copying the virtual container into a transient container queue and terminating the process;

if the item code appears in more than one virtual container, then copying the youngest virtual container into the transient container queue terminating the decoding process.

11. The method of claim 1, further comprising an aggregation process through:

receiving a container identifier from a container identifier reader;

determining the length of a transient container queue;

if the length is zero, rejecting the container;

if the length is equal to one, associating a virtual container to the container identifier, wherein the container and associated items are moved to a container queue and the transient container queue is reset;

if the length of the transient container queue is greater than one, then determining whether the virtual container identifiers are similar;

if the identifiers are not similar, resetting the transient container queue and rejecting the container;

if the virtual container identifiers are similar, then deleting all virtual containers from the transient container queue except one, and resuming the aggregation process by associating the virtual container to the container identifier.

12. The method of claim 11, further including associating the determined unique item identifier codes for multiple items in a physical container with the detected unique container identifier in a relational database system.

13. A computer-implemented system for identifying manufactured products in physical containers, each physical container suitable for containing two or more items, the system comprising: a computer processor configured to perform steps comprising:

generating a set of unique item identifier codes, each unique item identifier code corresponding to a specific item in a set of items;

at a production line, uniquely identifying multiple items by controlling marking of the multiple items with the corresponding unique item identifier codes;

at the production line, controlling mechanically aggregating two or more items for inclusion into a physical container by a container maker;

detecting, with one or more item readers placed either before or after the container maker, the unique item identifier codes on the set of items aggregated, or to be aggregated, into the physical container, and receiving the detected unique item identifier codes from the one or more item readers;

electronically storing the detected unique item identifier codes in a data store;

generating a virtual container having a temporary identifier which is not required to be identical to any physical container identifier, and associating the detected unique item identifier codes with the temporary identifier for the virtual container;

at the production line, uniquely identifying the physical container by controlling marking of the physical container with a unique container identifier;

detecting, with a container reader, the unique container identifier on the physical container and receiving the detected unique container identifier from the container reader;

detecting, with an item identifier reader, at least one unique item identifier code of the set of items after the set of items has been aggregated in the physical container, and receiving the detected at least one unique item identifier code from the item identifier reader;

determining unique item identifier codes for multiple items in the physical container based on the detected at least one unique item identifier code associated with the temporary identifier for the virtual container; and in the electronic data store, associating the determined unique item identifier codes for multiple items in the physical container with the detected unique container identifier.

14. The system of claim 13, further comprising detecting the unique item identifier codes on the set of items by imaging the identifiers through a clear-wrap binding the set of items into the physical container.

15. The system of claim 13, further comprising detecting the unique item identifier codes on the set of items at a location that is proximate in space or time to the step of mechanically allocating two or more items to be aggregated in the physical container.

16. The system of claim 13, further comprising detecting the unique item identifier codes on the set of items at a location that is not proximate in space or time to the step of mechanically allocating two or more items to be aggregated in the physical container.

17. The system of claim 13, further comprising detecting the unique item identifier codes by five imaging devices, each of the five imaging devices configured to detect two unique item identifier codes located proximate to each other in space.

18. The system of claim 13, further comprising detecting if a container complete signal is received.

19. The system of claim 13, further comprising generating the container complete signal based on a detection of a predetermined size of empty space between multiple physical containers.

* * * * *